United States Patent [19]

Hair

[11] Patent Number: 4,480,218
[45] Date of Patent: Oct. 30, 1984

[54] DIRECT DETECTION OF BACK EMF IN PERMANENT MAGNET STEP MOTORS

[75] Inventor: Victor D. Hair, Mint Hill, N.C.

[73] Assignee: International Business Machines Corporation, Armonk, N.Y.

[21] Appl. No.: 480,049

[22] Filed: Mar. 29, 1983

[51] Int. Cl.³ .............................................. H02K 29/04
[52] U.S. Cl. ...................................... 318/696; 318/685
[58] Field of Search ................. 318/685, 696; 368/157

[56] References Cited

U.S. PATENT DOCUMENTS

| | | | |
|---|---|---|---|
| 4,065,708 | 12/1977 | Ulland et al. | 318/685 |
| 4,223,260 | 9/1980 | Beer et al. | 318/696 |
| 4,234,838 | 11/1980 | Langley | 318/696 |
| 4,255,693 | 3/1981 | Keidl | 318/685 |
| 4,282,471 | 8/1981 | Budniak et al. | 318/685 |
| 4,340,946 | 7/1982 | Kanno et al. | 368/76 |
| 4,353,021 | 10/1982 | Watanabe et al. | 318/696 |

OTHER PUBLICATIONS

B. C. Kuo and K. Butts, Closed-Loop Control of a 3.6° Floppy-Disk Drive PM Motor by Back-EMF Sensing, NSF under Grant No. ECS 79-10829.

T. Higuchi, Closed Loop Control of PM Step Motors by Sensing Back EMF.

*Primary Examiner*—B. Dobeck
*Assistant Examiner*—Saul M. Bergmann
*Attorney, Agent, or Firm*—Karl O. Hesse

[57] ABSTRACT

By choosing the winding and drive circuit configuration of a conventional two phase step motor so that during any one step time, a drive current pulse in one winding is not magnetically coupled to the other winding, then the back EMF induced in this other winding by the permanent magnet of the motor can be used to generate a feedback emitter pulse. The zero crossings of the induced EMF coincides with the detent positions in a conventional two phase step motor. Only one winding of the two phase step motor is driven during any step time. In order to use this same winding as an emitter signal source during the next step time, the drive current in this winding is reduced to zero before the zero crossing of the EMF waveform which is induced in this winding by the permanent magnet of the motor. The drive current is quickly reduced by using a supply voltage substantially higher than the rated motor voltage.

12 Claims, 11 Drawing Figures

DIRECT DETECTION OF BACK EMF IN PERMANENT MAGNET STEP MOTORS

FIELD OF THE INVENTION

This invention relates to closed loop step motor control. More particularly, it relates to detecting the incremental position of the step motor without the need for separate position detecting encoders or pulse emitters.

BACKGROUND OF THE INVENTION

The use of the windings of a step motor to both drive the motor and to provide the position determining feedback pulses is known in the prior art. In each of the prior art systems, however, the feedback signals from the motor windings must be subjected to complex processing which increases the cost of the system. Such complex processing was required because whenever current is induced in a winding which is used as a sense winding, voltage drops due to this induced current are additive with the open circuit EMF induced by the permanent magnet of the motor. Thus the voltage drops due to the induced currents must be reconstructed and subtracted from the winding signal in order to detect the EMF induced by the permanent magnet of the motor.

U.S. Pat. No. 4,282,471 teaches using a reconstructed locked rotor response as the reference signal, which has the effect of subtracting it from the winding signal.

U.S. Pat. No. 4,234,838 uses a similar method on a variable reluctance motor.

U.S. Pat. No. 4,065,708 teaches a summing amplifier 6 for subtracting the output of amplifier 2 which simulates the voltage drop due to current.

A major drawback of these methods is the requirement of matching gain coefficients in the reconstruction circuitry with parameters of the motor. Another drawback is that some of these methods involve differentiation which is sensitive to noise and is subject to drift.

When reconstructing a voltage drop due to an induced current, the inductance and the resistance of the winding enter into the reconstruction calculations. In particular, the winding resistance varies with temperature, introducing a phase error in the detected signal. Although the inductance of the windings of a permanent magnet step motor are often assumed to be constant, in actual fact there often is at least some variation as a function of the angle of the rotor, and some variation as a function of the temperature of the magnetic circuit of the motor. This variation is borne out by the observations of B. C. Kuo and K. Butts as discussed in the Test Results section III of their paper entitled "Closed Loop Control of a 3.6 Degree Floppy Disc Drive PM Motor by Back EMF Sensing" published May 1982 in the Proceedings, Eleventh Annual Symposium on Incremental Motion Control Systems and Devices.

Another prior attempt at separating the induced EMF from the voltage drops due to induced currents is discussed by Toshiro Higuchi in his paper entitled "Closed Loop Control of PM Step Motors by Sensing Back EMF" which was also published in May 1982 in the above Proceedings.

Mr. Higuchi added special sense coils to the motor and used external transformers to cancel the induced voltage drop component in the sense coils. The drawbacks of this method are increased motor cost and the requirement for tuning the external transformer to match the winding inductance of the motor.

U.S. Pat. No. 4,255,693 shows another complex method of compensating for the voltage drops due to current. This patent drives the windings of a permanent magnet step motor with a pulse width modulated H driver which regulates the winding current to a predetermined waveform. Because the EMF induced by the permanent magnet of the motor affects the current, the pulse width modulator continually compensates by varying the pulse widths. A filter and phase shifter are used to detect these varying pulse widths which are then used as the indirect equivalent of the EMF induced by the permanent magnet.

SUMMARY OF THE INVENTION

An important feature of this invention is that it is capable of directly measuring the EMF induced by the permanent magnet of a step motor. By choosing the winding and drive circuit configuration so that during any one step time, a drive current pulse in one winding is not magnetically coupled to at least one other winding, then the back EMF induced in this other winding by the permanent magnet of the motor can be used to generate a feedback emitter pulse. Advantageously, the zero crossing of the induced EMF coincides with the detent position of a conventional two phase step motor.

This invention provides for example, that only one winding of a two phase step motor is to be driven during any step time. In order to use this same winding as an emitter signal source during the next step time, the drive current in this winding is reduced to zero before the zero crossing of the EMF waveform which is induced in this winding by the permanent magnet of the motor.

The drive current is quickly reduced according to the teachings of this invention by using a supply voltage very substantially higher than the rated motor voltage. If only very low motor speeds are required, the supply voltage need not be as high as when higher speeds are required.

The use of a high drive voltage and low impedance motor windings of the invention can result in excessive winding current at low motor angular velocities. A pulse width modulating current responsive switch is included in the invention to prevent excessive current.

BEST MODE FOR CARRYING OUT THE INVENTION:

Direct detection of back EMF as accomplished by this invention is based upon the fact that the open circuit voltage across either phase winding is identically equal to the back EMF induced in that winding by the permanent magnet of the motor. During normal step motor operation, however, the phase windings are usually not truly open circuited and in the case of "four phase two on" excitation, they are not even magnetically decoupled. Therefore the key to direct detection as accomplished by this invention is the drive circuit type and the phase excitation sequence of windings which are orthogonal to each other.

Figure 1:
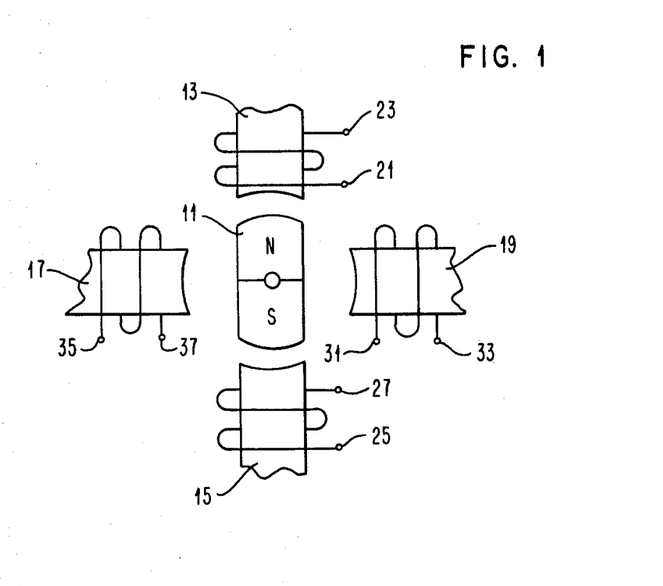
FIG. 1 shows a typical schematic of a two phase permanent magnet step motor.

In FIG. 1 there is shown, a schematic of a two phase permanent magnet step motor having orthogonal windings. In actual implementation, the permanent magnet motor will appear as a multi-tooth gear and the stator poles will have corresponding teeth so as to permit many motor steps per revolution. These implementation details are well within the skill of the art and need not be dwelt upon here. Referring again to FIG. 1, a rotor 11 is shown having a permanent magnet North and South pole. A pair of a stator poles 13 and 15 provide one pole position A of the two pole motor. Another pair of poles B, labeled 17 and 19 are placed in a 90° relationship to the A poles 13 and 15. Each of these poles has a winding having terminals labeled 21,23 and 25,27 for the A pole windings and 31,33 and 35,37 for the B pole windings. These windings are connected to the drive circuit of the invention as shown in detail in FIG. 6.

Figure 2:
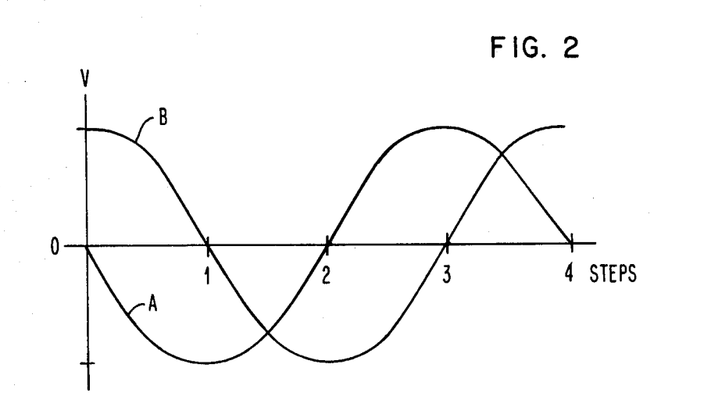
FIG. 2 shows the EMF waveforms induced in any one of the windings of each phase of the motor of FIG. 1.

Referring now to FIG. 2, the EMF waveforms induced in each of the windings on the A and B poles is shown with the zero position corresponding to the position of the rotor as shown in FIG. 1. The two waveforms of FIG. 2 are simple sinusoidal quadrature waveforms and thus need no further explanation, except that each zero crossing demarks a detent or step angle position.

As mentioned above, important factors in the ability to directly detect step motor rotor position from back EMF waveforms is the type of drive circuit employed and the phase excitation sequence. A preferred embodiment of a drive circuit for the invention is the two phase "H" driver shown in a simplified schematic in FIG. 3. This circuit permits bipolar excitation of a winding from a single supply voltage. Other drive circuits can also be used so long as the windings are driven orthogonally. In other words, to detect the zero crossings of the back EMF, a two pole motor must be driven one phase on at a time so that each winding is off half of the time and magnetically decoupled from the on winding.

As previously mentioned, to directly detect back EMF, the winding providing the back EMF signal must be effectively open circuited thereby eliminating any voltage drop due to current flow. Referring again to FIG. 3, the open circuit condition of the off winding means that all four transistors 41, 43, 45, and 47 are not conducting current. Any inductive kick VA which occurs as transistors 41 and 47 for example, turn off is clamped by diodes 55 and 53 to approximately one or two volts above the power supply voltage depending upon the diode voltage drop. These suppression diodes 55 and 53 continue to conduct until the field energy is completely dissipated as the field due to the previous excitation collapses. As VA becomes equal to or less than the power supply voltage, no further current can flow and thereafter, the diodes cease conducting and the winding is effectively open circuited. After the field due to the previous excitation has collapsed, and current ceases to flow, the voltage VA across the terminals 21, 23 of the off winding is only that voltage induced in the winding by the permanent magnet of the rotor.

Figure 4:
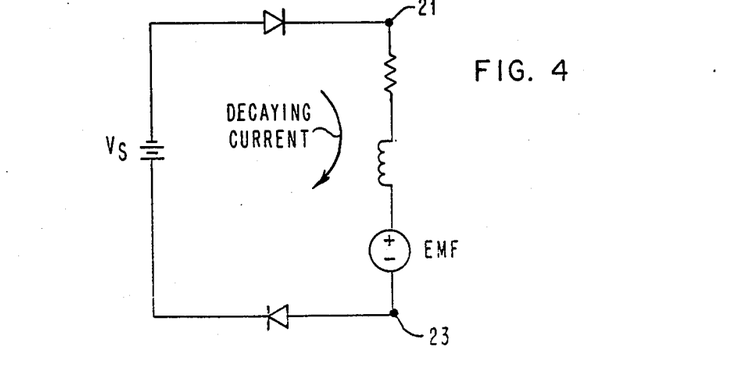
FIG. 4 is an equivalent circuit of the circuit of FIG. 3 as the drive current is decaying.

Referring now to FIG. 4, an equivalent circuit shows the clamping of the inductive voltage kick to a magnitude not significantly greater than the supply voltage VS as the motor is accelerating. Note for future reference that as the motor is accelerating, the EMF opposes current flow. As will be mentioned later, when the motor is decelerating, the EMF polarity reverses and aids current flow which yields a longer current decay time.

If in the previous example, transistors 43 and 45 had been conducting and were turned off, diodes 57 and 51 would provide the clamp current path to control the magnitude of the inductive kick until the energy of the collapsing excitation field had been dissipated.

With the previous discussion in mind, it can be seen that it is important to the invention that the EMF induced in a winding by the permanent magnet rotor must cross zero during the off period of the excitation of that winding in order to be accurately measured.

Likewise, the rate of decay of current in the winding must be sufficiently high so that the open circuit condition occurs prior to the zero crossing of the EMF induced by the permanent magnet rotor. Finally, the motor must be driven as an orthogonal phase machine with one phase on at a time so that the on and off phases are decoupled.

Figure 5:
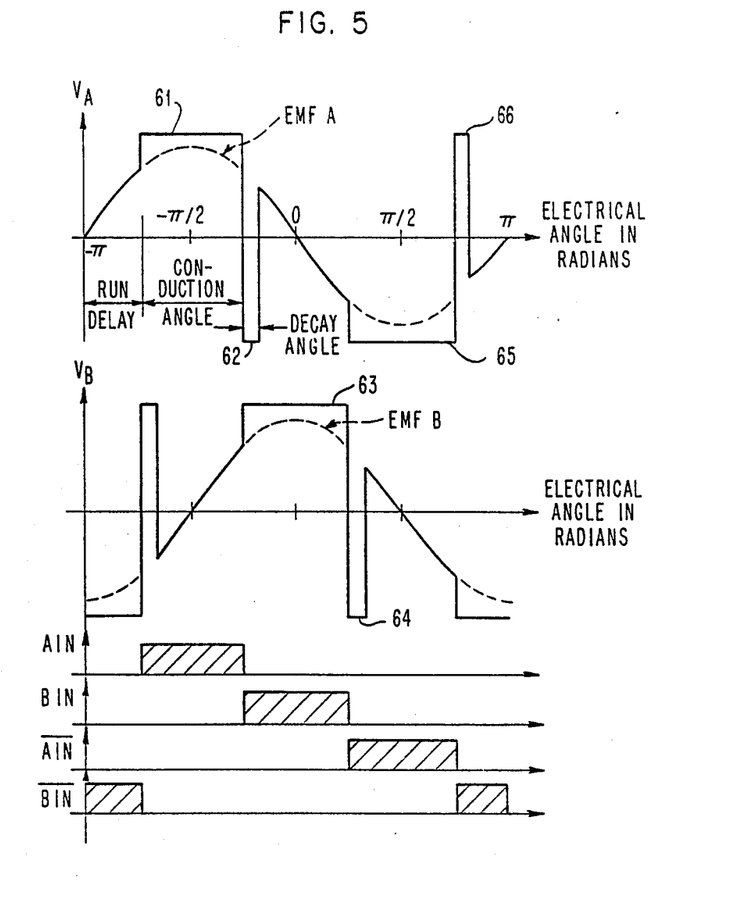
FIG. 5 shows the excitation waveforms when the motor is running at constant velocity.

Referring now to FIG. 5, typical waveforms for the A and B poles are shown as the motor is operating at a constant velocity. In order to detect the zero crossing of the EMF induced by the permanent magnet of the motor, the sum (excitation angle) of the conduction angle and the decay angle must lie within the interval from minus pi to zero in order to provide positive average torque. Likewise, if the sum of these angles lies within the interval from zero to pi a negative average torque is provided for decelerating the motor.

In order to provide the suitably limited conduction angle, it has been found that the use of a low impedance motor with a large supply voltage provides good performance at low cost. This may be explained with reference to FIG. 5, where the conduction angle is shown centered at negative pi over 2. This results in maximum average positive torque at low speeds or whenever the current rise and fall times are negligibly small compared to the step period. The use of a low impedance motor thus allows optimum utilization of available motor torque without allowing the position of the excitation angle to fall outside of the interval from minus pi to zero. The use of a low impedance motor and high supply voltage yields a quick current decay which minimizes the decay angle by shortening the decay time, thus providing more flexibility in the positioning of the conduction angle. For example in the limit of zero decay angle, it is possible to vary the conduction angle from one centered at minus 3 pi over 4 radians to one centered at minus pi over 4 radians while maintaining its position within the interval from minus pi to zero. This feature allows some degree of closed loop velocity control over the motor.

Low motor impedance and high drive voltage is even more important during motor deceleration when the excitation angle is in the interval of zero to pi. During this interval, the collapsing excitation field and the EMF induced by the permanent magnet of the rotor are additive which increases the length of time required for the current in the winding to decay to zero. The large supply voltage and low inductance overcome the effect of the induced EMF due to the permanent magnet of the rotor and provide a rapid current decay.

Figure 3:
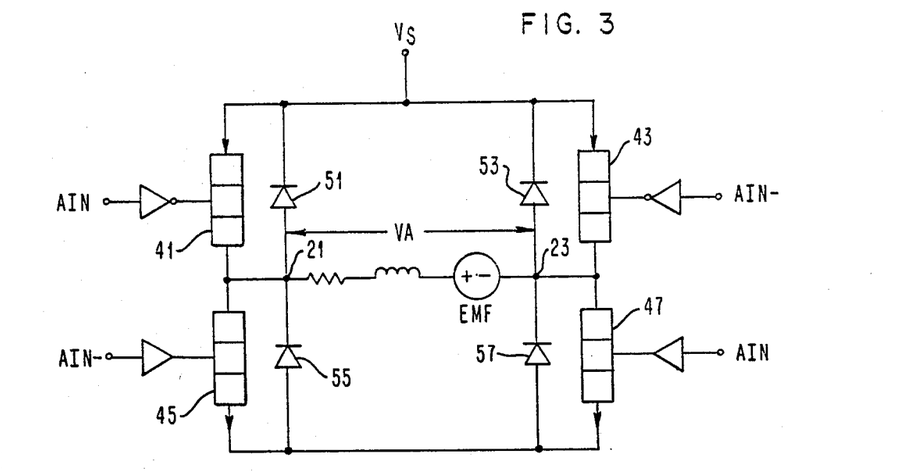
FIG. 3 is a simplified schematic of an H drive circuit for one phase of the motor of FIG. 1.

Referring again to FIG. 5, it can be seen that conduction angle 61 corresponds to the conduction of transistors 41 and 47 of the driver of FIG. 3 for the A poles. Decay angle 62 corresponds to that period of time when diodes 55 and 53 are clamping the winding voltage to the supply voltage, causing the current to rapidly decay to zero. Likewise, conduction angle 63 corresponds to the conduction of transistors 41 and 47 of the driver driving the B pole windings. Decay angle 64 corresponds to the conduction of current through 55 and 53 of the B pole driver. Conduction angle 65 corresponds to the conduction of energizing current through transistors 43 and 45 of the A pole driver of FIG. 3. Decay angle 66 corresponds to the dissipation of energization field energy through diodes 57, 51. It will be noted in FIG. 5 that no current is flowing in the winding as the voltage induced in the winding by the permanent magnet of the rotor is crossing zero which is a detent angle of the motor. Therefore, it only remains to detect this zero crossing angle in order to provide an emitter pulse corresponding to a detent angle of the motor. A detailed schematic of a circuit used to detect this zero crossing is shown in FIG. 7.

Figure 6:
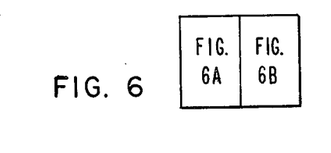
FIGS. 6, 6a and 6b show a detailed schematic of the drive circuit of the invention for driving a two phase permanent magnet step motor.
Figure 6A:
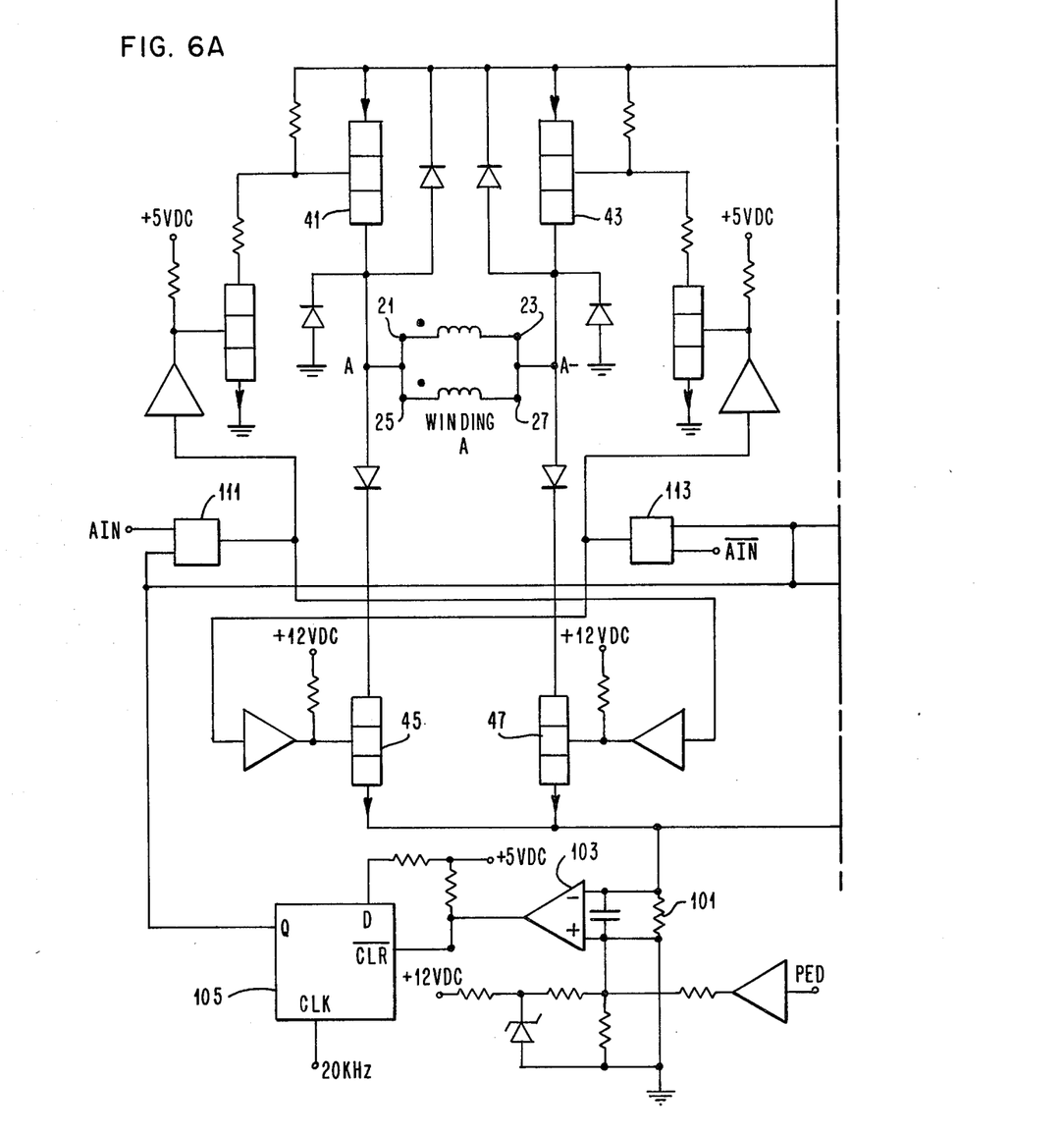
Figure 6B:
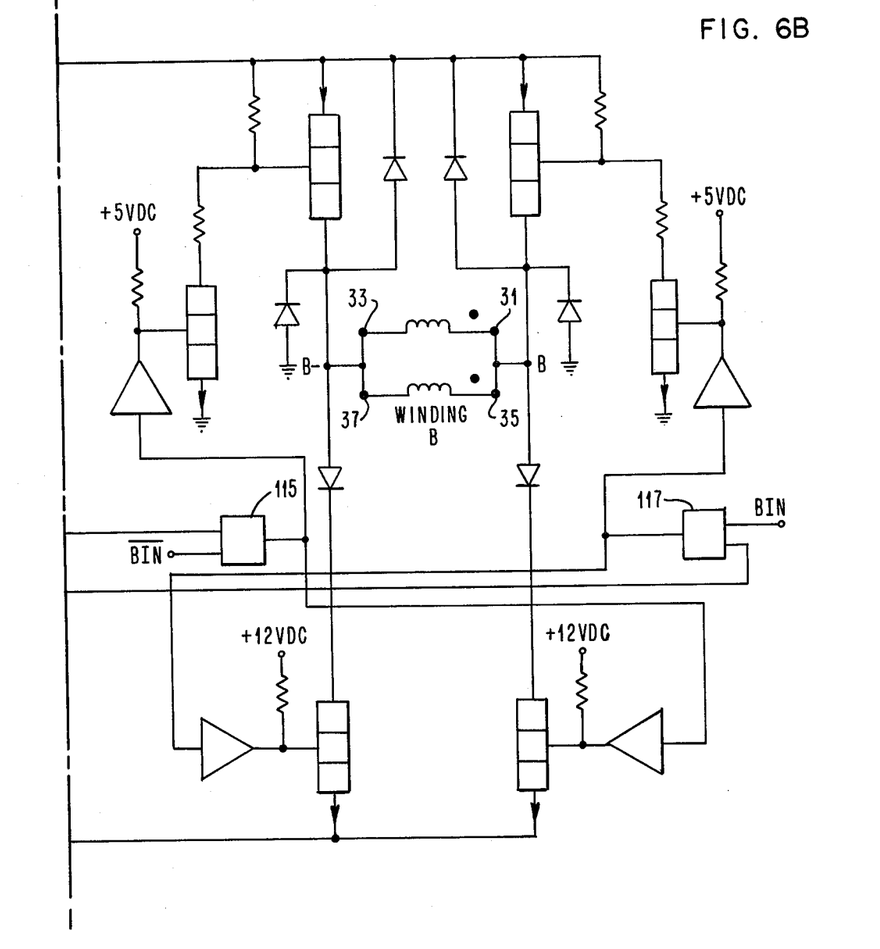
Figure 7:
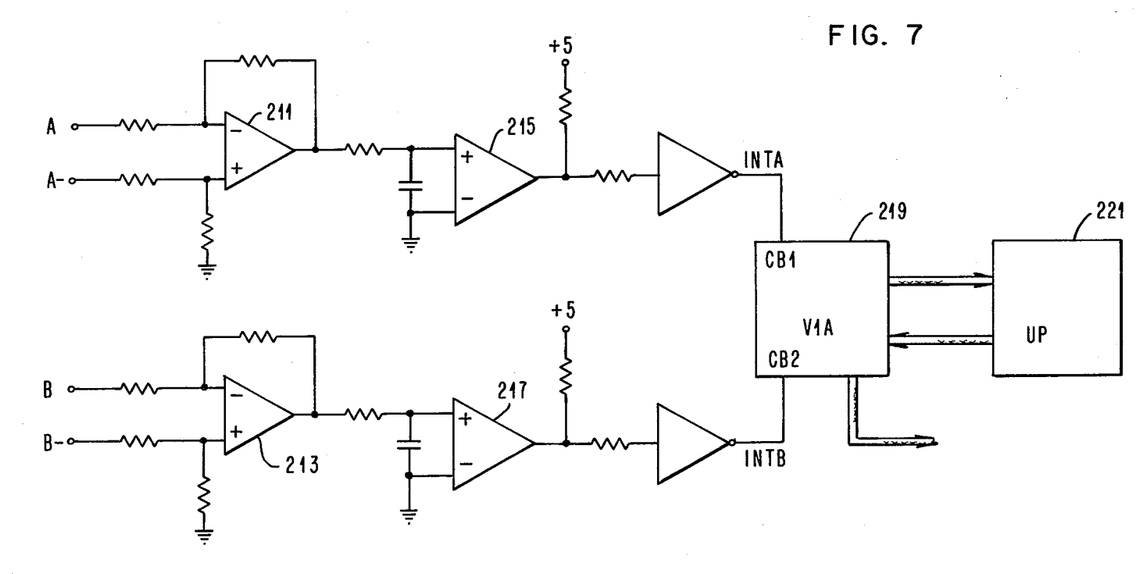
FIG. 7 shows a detailed schematic of the circuits used to directly detect the EMF induced in the windings by the permanent magnet of the motor.

Prior to discussion of FIG. 7, attention will be directed to the detailed driver circuit of FIG. 6 which includes a pulse width modulating current limiting circuit including current sense resistor 101 and comparator 103. Comparator 103 compares the voltage across current sensing resistor 101 with a reference voltage derived from a DC supply. When the current rises to such a level so that the voltage across resistor 101 exceeds the reference voltage, bistable circuit 105 is reset. When circuit 105 resets, its output acts to inhibit output from any of the AND gates 111, 113, 115, and 117 which normally provide sequencing signals to transistors 41, 43, 45, and 47 for each of the winding of the A poles and the B poles. Circuit 105 also receives a clock input signal of 20 kilohertz to repeatedly set bistable circuit 105 after the current has decayed slightly. In this way, a low impedance motor can be driven from a high voltage supply without causing excessive currents and temperatures to build up in the motor.

Referring now to FIG. 7, there is shown a detailed schematic of the sensing means which senses the EMF induced in each winding. The input terminals at the left of the figure labeled A, A-, B, B-, are the terminals of the winding of the A pole and the B pole respectively and correspond to the nodes labeled similarly in FIG. 6. Differential amplifiers 211 and 213 perform two functions. First the amplifiers multiply the input voltage by a scaling factor to reduce that voltage to appropriate levels. Secondly the differential amplifiers reference the voltage to ground zero volts for processing by logic and microprocessor circuits. Connected to the outputs of differential amplifiers 211 and 213 are comparators 215 and 217 respectively. These comparators compare the now referenced and scaled EMF induced in each winding by the permanent magnet of the rotor to zero volts and provide an output signal as the EMF crosses zero volts. The output signal is used as an interrupt to the interrupt inputs of a versatile interface adaptor chip 219. The versatile interface adaptor chip interrupt inputs are programmable by a microprocessor to respond either to a rising or a falling edge detection and an interrupt enable register allows independent enabling and masking of the interrupts. Such chips are well known in the art, an example being as SY6522 by SYNERTEK Incorporated.

Figure 9:
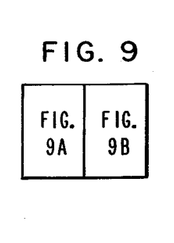
FIG. 9 is a flow diagram of the microprogram of table 1 of the specification.
Figure 9A:
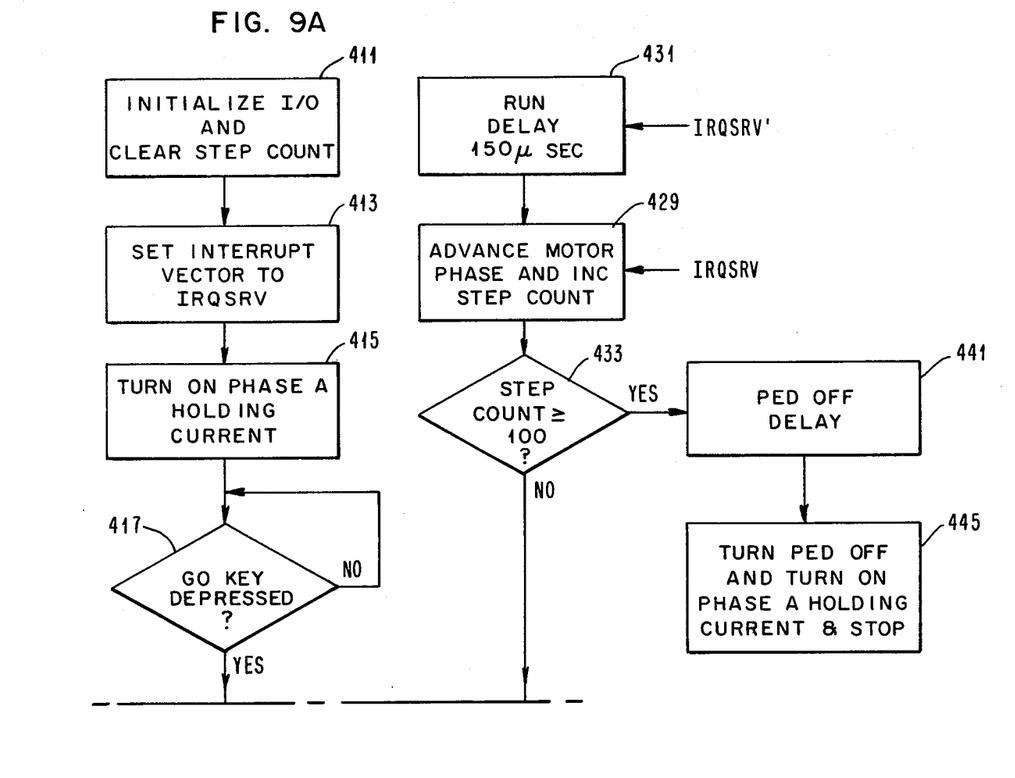
Figure 9B:
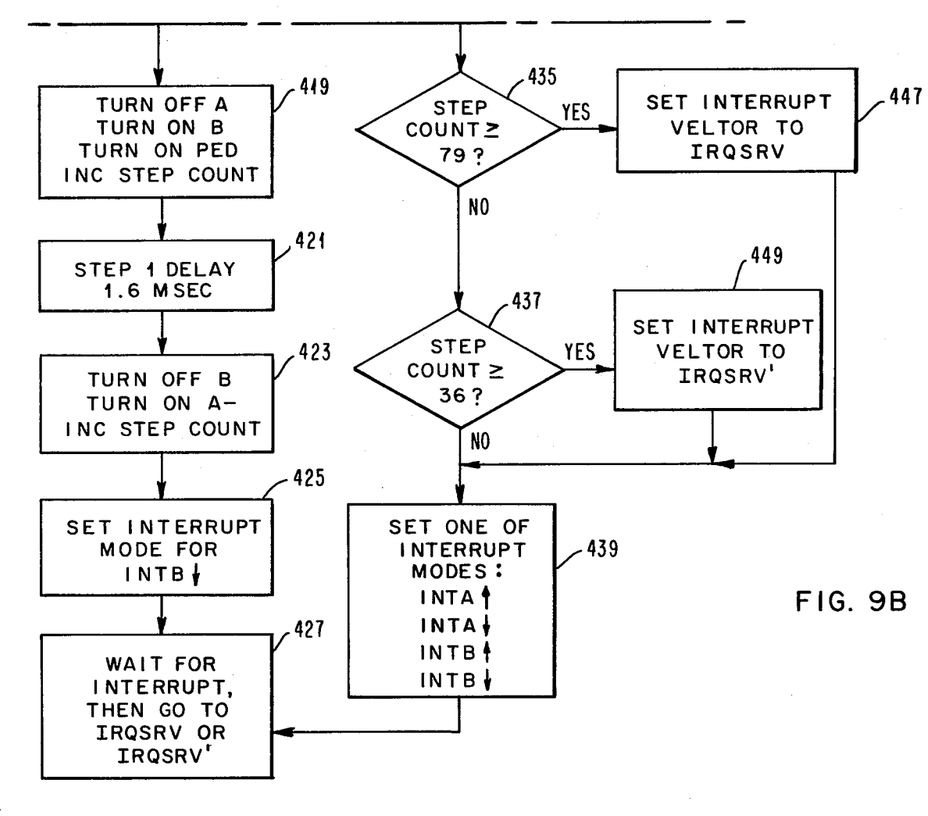

Under control of the microprogram in table 1 a suitable microprocessor 221 such as the SY6502 (also by SYNERTEK) the interrupt inputs are alternately enabled and disabled and, at each interrupt, alternately set for rising and then falling edge detection (block 439 in FIG. 9). This allows the detection of each zero crossing of both of the EMF waveforms shown in FIG. 2 as they cross from positive to negative and negative to positive voltages.

TABLE 1

| INST LOCN | OP CD | OPER- AND | STMT NO | LABEL | OP | T | *OPEPAND | COMMENT |
|---|---|---|---|---|---|---|---|---|
|  |  |  | 1 | CLEMF9 | ORG |  | H200 | ACCEL/SLEW/DECEL PROGRAM |
| 0200 | 78 |  | 2 |  | SEI |  |  | DISABLE INTERRUPTS |
| 0201 | A9 | 01 | 3 |  | LDA | I | H01 | LOAD AND STORE PHASE DATA |
| 0203 | 85 | 30 | 4 |  | STA | 0 | H30 |  |
| 0205 | A9 | 02 | 5 |  | LDA | I | H02 |  |
| 0207 | 85 | 31 | 6 |  | STA | 0 | H31 |  |
| 0209 | A9 | 04 | 7 |  | LDA | I | H04 |  |
| 020B | 85 | 32 | 8 |  | STA | 0 | H32 |  |
| 020D | A9 | 08 | 9 |  | LDA | I | H08 |  |
| 020F | 85 | 33 | 10 |  | STA | 0 | H33 |  |
| 0211 | A9 | 40 | 11 |  | LDA | I | H40 | LOAD AND STORE PCR DATA |
| 0213 | 85 | 50 | 12 |  | STA | 0 | H50 |  |
| 0215 | A9 | 10 | 13 |  | LDA | I | H10 |  |
| 0217 | 85 | 53 | 14 |  | STA | 0 | H53 |  |
| 0219 | A9 | 00 | 15 |  | LDA | I | H00 |  |
| 021B | 85 | 51 | 16 |  | STA | 0 | H51 |  |
| 021D | 85 | 52 | 17 |  | STA | 0 | H52 |  |
| 021F | A9 | 88 | 18 |  | LDA | I | H88 | LOAD AND STORE IER DATA |
| 0221 | 85 | 54 | 19 |  | STA | 0 | H54 |  |
| 0223 | 85 | 56 | 20 |  | STA | 0 | H56 |  |
| 0225 | A9 | 90 | 21 |  | LDA | I | H90 |  |
| 0227 | 85 | 55 | 22 |  | STA | 0 | H55 |  |
| 0229 | 85 | 57 | 23 |  | STA | 0 | H57 |  |
| 022B | 20 | 86 8B | 24 |  | JSR | A | ACCESS | UNWRITE PROTECT SYSTEM RAM |
| 022E | A9 | 1F | 25 |  | LDA | I | H1F |  |

TABLE 1-continued

| INST LOCN | OP CD | OPER- AND | STMT NO | LABEL | OP | T | *OPEPAND | COMMENT |
|---|---|---|---|---|---|---|---|---|
| 0230 | 8D | 02 AC | 26 | | STA | A | DDRB | INITIALIZE DDRB FOR OUTPUT |
| 0233 | A2 | 00 | 27 | | LDX | I | H00 | CLEAR STEP TABLE POINTER |
| 0235 | A0 | 00 | 28 | | LDY | I | H00 | CLEAR STEP COUNTER |
| 0237 | A9 | 90 | 29 | | LDA | I | H90 | |
| 0239 | 8D | FE FF | 30 | | STA | A | UIRQVCL | INTERRUPT VECTOR LOW ← 90 |
| 023C | A9 | 02 | 31 | | LDA | I | H02 | |
| 023E | 8D | FF FF | 32 | | STA | A | UIRQVCH | INTERRUPT VECTOR HIGH ← 02 |
| 0241 | A9 | 01 | 33 | | LDA | I | H01 | |
| 0243 | 8D | 00 AC | 34 | | STA | A | DRB | TURN ON PHASE A / HOLDING CURRENT |
| 0246 | 20 | 23 89 | 35 | DNTGO | JSR | A | KEYQ | |
| 0249 | F0 | FB | 36 | | BEQ | | DNTGO | WAIT FOR KEY DEPRESSION |
| 024B | E8 | | 37 | | INX | | | INCREMENT TABLE POINTER |
| 024C | C8 | | 38 | | INY | | | INCREMENT STEP COUNTER |
| 024D | B5 | 30 | 39 | | LDA | Z | H30 | |
| 024F | 09 | 10 | 40 | | ORA | I | H10 | |
| 0251 | 8D | 00 AC | 41 | | STA | A | DRB | TURN ON PHASE B / STEP CURRENT |
| 0254 | E8 | | 42 | | INX | | | INCREMENT TABLE POINTER |
| 0255 | 20 | 77 02 | 43 | | JSR | A | DELAY1 | GOTO DELAY1 ROUTINE |
| 0258 | B5 | 30 | 44 | | LDA | Z | H30 | |
| 025A | 09 | 10 | 45 | | ORA | I | H10 | |
| 025C | 8D | 00 AC | 46 | | STA | A | DRB | TURN ON PHASE C / STEP CURRENT |
| 025F | B5 | 50 | 47 | | LDA | Z | H50 | SET INTERRUPT MODE |
| 0261 | 8D | 0C AC | 48 | | STA | A | PCR | |
| 0264 | AD | 00 AC | 49 | | LDA | A | DRB | |
| 0267 | A9 | 7F | 50 | | LDA | I | H7F | |
| 0269 | 8D | 0E AC | 51 | | STA | A | IER | |
| 026C | B5 | 54 | 52 | | LDA | Z | H54 | |
| 026E | 8D | 0E AC | 53 | | STA | A | IER | |
| 0271 | E8 | | 54 | | INX | | | INCREMENT TABLE POINTER |
| 0272 | C8 | | 55 | | INY | | | INCREMENT STEP COUNTER |
| 0273 | 58 | | 56 | | CLI | | | ENABLE INTERRUPTS |
| 0274 | 4C | 74 02 | 57 | WAIT | JMP | A | WAIT | WAIT FOR INTERRUPT |
| 0277 | A9 | 02 | 58 | DELAY1 | LDA | I | H02 | TIME DELAY ROUTINE(1.6MS) |
| 0279 | 85 | 41 | 59 | | STA | 0 | H41 | |
| 027B | A9 | 50 | 60 | OLOOP | LDA | I | H50 | |
| 027D | 85 | 42 | 61 | | STA | 0 | H42 | |
| 027F | C6 | 42 | 62 | ILOOP | DEC | 0 | H42 | |
| 0281 | D0 | FC | 63 | | BNE | | ILOOP | |
| 0283 | C6 | 41 | 64 | | DEC | 0 | H41 | |
| 0285 | D0 | F4 | 65 | | BNE | | OLOOP | |
| 0287 | 60 | | 66 | | RTS | | | RETURN |
| 0288 | A9 | 08 | 67 | | LDA | I | H08 | |
| 028A | 85 | 41 | 68 | | STA | 0 | H41 | |
| 028C | C6 | 41 | 69 | LP3 | DEC | 0 | H41 | |
| 028E | D0 | FC | 70 | | BNE | | LP3 | |
| 0290 | B5 | 30 | 71 | IRQSRV | LDA | Z | H30 | |
| 0292 | 09 | 10 | 72 | | ORA | I | H10 | |
| 0294 | 8D | 00 AC | 73 | | STA | A | DRB | TURN ON NEXT PHASE / STEP CURRENT |
| 0297 | C8 | | 74 | | INY | | | INCREMENT STEP COUNTER |
| 0298 | C0 | 64 | 75 | | CPY | I | H64 | |
| 029A | F0 | 41 | 76 | | BEQ | | STPSRV | GOTO STOP ROUTINE IF STEP COUNTER=100 |
| 029 | C0 | 4F | 77 | | CPY | I | H4F | |
| 029E | F0 | 1E | 78 | | BEQ | | BRKSRV | GOTO BRAKE ROUTINE IF STEP COUNT=79 |
| 02A0 | C0 | 24 | 79 | | CPY | I | H24 | |
| 02A2 | F0 | 59 | 80 | | BEQ | | SLWSRV | GOTO SLEW ROUTINE IF STEP COUNT=36 |
| 02A4 | B5 | 50 | 81 | BACK | LDA | Z | H50 | SET NEW INTERRUPT MODE |
| 02A6 | 8D | 0C AC | 82 | | STA | A | PCR | |
| 02A9 | AD | 00 AC | 83 | | LDA | A | DRB | CLEAR IFR |
| 02AC | A9 | 7F | 84 | | LDA | I | H7F | |
| 02AE | 8D | 0E AC | 85 | | STA | A | IER | CLEAR IER |
| 02B1 | B5 | 54 | 86 | | LDA | Z | H54 | |
| 02B3 | 8D | 0E AC | 87 | | STA | A | IER | REWRITE IER WITH NEW VALUE |
| 02B6 | E0 | 03 | 88 | | CPX | I | H03 | |
| 02B8 | D0 | 02 | 89 | | BNE | | NYET | |
| 02B/ | A2 | FF | 90 | | LDX | I | HFF | |
| 02BC | E8 | | 91 | NYET | INX | | | X←X+1 FOR X≠3, X←0 FOR X=3 |
| 02BD | 40 | | 92 | | RTI | | | RETURN |
| 02BE | A9 | 90 | 93 | BRKSRV | LDA | I | H90 | |
| 02C0 | 8D | FE FF | 94 | | STA | A | UIRQVCL | SET NEW INTERRUPT VECTOR |
| 02C3 | A9 | 40 | 95 | | LDA | I | H40 | LOAD AND STORE PCR DATA |
| 02C5 | 85 | 52 | 96 | | STA | 0 | H52 | |
| 02C7 | A9 | 10 | 97 | | LDA | I | H10 | |
| 02C9 | 85 | 51 | 98 | | STA | 0 | H51 | |
| 02CP | A9 | 00 | 99 | | LDA | I | H00 | |
| 02CD | 85 | 50 | 100 | | STA | 0 | H50 | |
| 02CF | 85 | 53 | 101 | | STA | 0 | H53 | |
| 02D1 | 4C | A4 02 | 102 | | JMP | A | BACK | |
| 02D4 | A9 | FF | 103 | DELAY3 | LDA | I | HFF | PEDESTAL OFF DELAY ROUTINE |
| 02D6 | 85 | 41 | 104 | | STA | 0 | H41 | |
| 02D8 | C6 | 41 | 105 | LP2 | DEC | 0 | H41 | |

TABLE 1-continued

| INST LOCN | OP CD | OPER-AND | STMT NO | LABEL | OP | T | *OPEPAND | COMMENT |
|---|---|---|---|---|---|---|---|---|
| 02DA | D0 | FC | 106 | | BNE | | LP2 | |
| 02DC | 60 | | 107 | | RTS | | | |
| 02DD | A9 | 7F | 108 | STPSRV | LDA | I | H7F | |
| 02DF | 8D | 0E AC | 109 | | STA | A | IER | CLEAR IER |
| 02E2 | 20 | D4 02 | 110 | | JSR | A | DELAY3 | GOTO PED OFF DELAY ROUTINE |
| 02E5 | B5 | 30 | 111 | | LDA | Z | H30 | TURN OFF PEDESTAL |
| 02E7 | 8D | 00 AC | 112 | | STA | A | DRB | |
| 02EA | 40 | | 113 | | RTI | | | RETURN |
| 02EB | A0 | 00 | 114 | ACCSRV | LDY | I | H00 | Y←0 |
| 02ED | A9 | 40 | 115 | | LDA | I | H40 | LOAD AND STORE PCR DATA |
| 02EF | 85 | 50 | 116 | | STA | 0 | H50 | |
| 02F1 | A9 | 10 | 117 | | LDA | I | H10 | |
| 02F3 | 85 | 53 | 118 | | STA | 0 | H53 | |
| 02F5 | 98 | | 119 | | TYA | | | |
| 02F6 | 85 | 51 | 120 | | STA | 0 | H51 | |
| 02F8 | 85 | 52 | 121 | | STA | 0 | H52 | |
| 02FA | 4C | A4 02 | 122 | | JMP | A | BACK | |
| 02FD | A9 | 88 | 123 | SLWSRV | LDA | I | H88 | |
| 02FF | 8D | FE FF | 124 | | STA | A | UIRQVCL | SET NEW INTERRUPT VECTOR |
| 0302 | 4C | A4 02 | 125 | | JMP | A | BACK | |
| 0305 | C6 | 43 | 126 | DELAY2 | DEC | 0 | H43 | SLEW DELAY ROUTINE |
| 0307 | D0 | FC | 127 | | BNE | | DELAY2 | |
| 0309 | 60 | | 128 | | RTS | | | |
| | | | 129 | | END | | | |

OPERATION OF THE PREFERRED EMBODIMENT OF THE INVENTION

Figure 8:
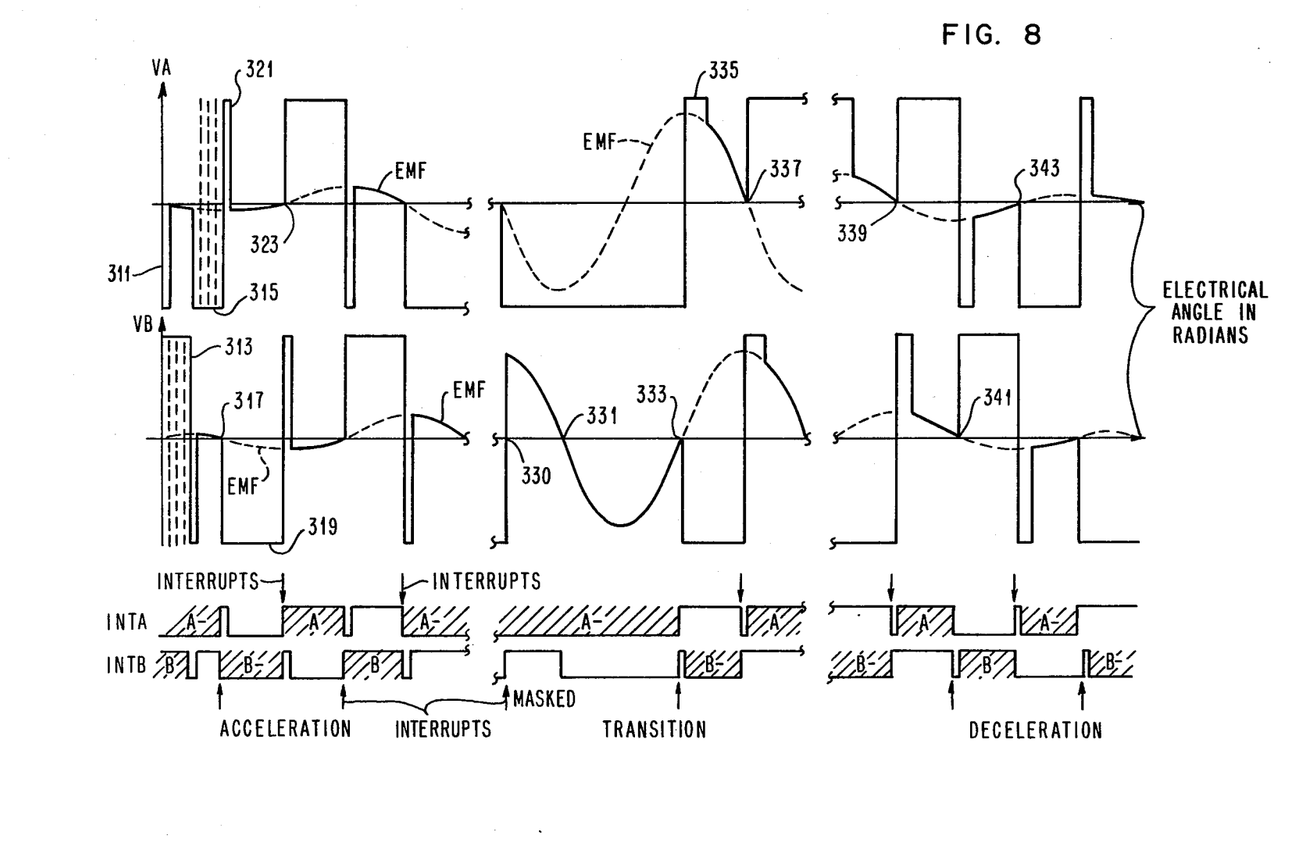
FIG. 8 shows the voltages at the terminals of the windings of the motor as the motor is accelerated, as the motor operation is changed from steady state run to deceleration, and as the motor is decelerated.

FIG. 8 is a timing diagram which illustrates the relationship between the EMF induced in a winding by the permanent magnet of the rotor and the phase select signals which provide the current pulses to the windings to drive the motor. In order to get the motor started, two open loop pulses are generated by the microprocessor. Subsequent pulses are initiated by sensing and detecting the zero crossing points of the EMF waveforms induced in the windings by the permanent magnets of the rotor. In this example, the drivers are switched so as to drive current into each winding at the zero crossing. This results in a lead angle of two steps. The sequence of events and interrupt control programs are shown in table 1 and in the flow diagram of FIG. 9. The duration of the first pulse is selected so that for a minimum load, the open circuit condition occurs just before the first zero crossing of the EMF waveform. This provides the maximum adaptability to load increases.

Referring again to FIG. 8 it is assumed that a holding current has been applied to the A pole winding as at statement 34 in table 1 and block 415 of FIG. 9, to keep the motor held at a detent position. The holding current is turned off at time zero shown at block 419 of FIG. 9, which gives an inductive kick which is clamped as shown in the part of the waveform labeled 311 in FIG. 8. At the same time as the A winding is de-energized, the B winding is energized as shown at 313. The current limiting action of comparator 103 and bistable circuit 105 switching the drive transistors 43, 45 alternately off and on is shown in FIG. 8 as the dotted lines within voltage waveforms 313 and 315. Waveforms 319 etc. will have a similar voltage pulse width modulation but for clarity of the sensing description, these details are not shown. A 1.6 milisecond time delay is now counted at statement 58 (block 421 in FIG. 9) by the microprocessor before returning to the microprogram at statement number 44 (block 423 in FIG. 9) to turn on transistors 43, 45 of FIG. 6 causing current to flow in the A pole windings in the direction reverse to its original holding current. The voltage across the A windings is represented at 315 in FIG. 8. At this time, the versatile interrupt adaptor 219 is set up to detect the zero crossing 317 of the EMF induced in the B winding by a permanent magnet of the rotor. The program of table 1 then waits at statement 57 (block 427 in FIG. 9) until the interrupt is generated by the circuits of FIG. 7. When the interrupt is received, the program jumps to the interrupt service routine at statement 71, (block 429 in FIG. 9) which switches off the current in the A pole windings and turns on the current in the B pole winding which is driven by the voltage waveform 319. The inductive kick 321 of the A pole winding is clamped to the power supply voltage which causes the A winding current to decay long before the EMF induced in the A winding by the permanent magnet of the motor crosses zero at 323. After turning on the transistors to drive current through the B pole winding, the program continues to check at blocks 433, 435, and 437, the number of steps that have been taken. Being a one hundred step example, the motor is accelerated for 36 steps, operated in the run mode as shown in FIG. 5 until step 79 and then decelerated until step 100, at which time a lower steady state current is continuously applied (block 445 in FIG. 9) to one of the windings to detent the motor in the stop position. The lower current is provided by the pedestal signal labeled PED provided by the versatile interface adaptor to the circuit of FIG. 6. PED provides a lower value reference voltage which causes comparator 103 to provide shorter voltage pulses to the winding being energized.

The motor is operated with the same interrupt programming for both acceleration and run states. During the run state, the positive acceleration torque just balances the motor load. In order to make the transition from acceleration to deceleration, it is necessary to change the interrupt programming to detect transitions of the opposite polarity and then to introduce a single masking delay.

This is shown in FIG. 8 where the positive zero crossing transition 330 is masked. Since the responsive polarity of the interrupt input has been changed the interrupt normally provided by the zero crossing at 331 is ignored so as not to cause a change in the current of the winding. Instead, the zero crossing 180° later at 333, is used to switch the windings and cause currents to flow providing negative torque. As can be seen at 335, the inductive kick of the A pole winding is wider during deceleration because the EMF induced by the motor winding adds energy to the inductive kick. So long as the current had decayed to zero before the next zero crossing at 337, the wider current decay pulse does not present a problem. Thereafter the motor continues to switch at each zero crossing until step 100 where the program ends with the A phase energized to hold the motor in a detent position.

After the program has driven the step motor for 36 steps, a switching delay is introduced to reduce the accelerating torque to that required to drive the load and cause a constant velocity. This delay which results in the conduction angle being nearly centered on the zero crossing of the EMF waveform in the other winding is shown clearly in FIG. 5 as RUN DELAY. The RUN DELAY is provided in the microprogram of table 1 by changing the interrupt vector to statement 67 (block 431 in FIG. 9) which introduces a delay routine before the interrupt is serviced at statement 71.

From the foregoing description of the drawings, it can be seen that a low impedance two pole step motor can be driven from a relatively high voltage supply so that the voltage induced in the winding by the permanent magnet of the rotor can be directly detected and used as emitter pulses to control the operation of the motor without the need for separate emitters or other velocity or position detecting hardware. The foregoing and other advantages, will be clear to those skilled in the art of step motor control so as to enable them to make and use the invention as defined in the following claims:

I claim:

1. A step motor control comprising:
    a supply voltage for the motor;
    drive means connected to said supply voltage for orthogonally driving each of orthogonal low impedance windings of the motor;
    means for causing the current in one of said orthogonal windings to decay rapidly to zero while another of said orthogonal windings is being driven by said drive means;
    sensing means connected across said one of said orthogonal windings for directly sensing the voltage induced in said one of said orthogonal windings by the permanent magnet of the motor after the current in said one of said orthogonal windings has decayed to substantially zero.

2. The step motor control of claim 1 wherein said drive means further includes:
    current responsive means for limiting the current through any of said windings so as to prevent overheating of said windings.

3. The step motor control of claim 1 wherein said drive means has switching devices capable of driving current through a winding in either of two directions, and wherein said current responsive means turns off said switching devices when said current exceeds a predetermined value and thereafter permits said switching devices to be again turned on.

4. The control means of claim 2 wherein said sensing means further includes:
    a differential sensing means for referencing the voltage across said one of said orthogonal windings to a fixed reference voltage;
    comparator means connected to said differential sensing means to detect when said voltage across said one of said orthogonal windings crosses said reference voltage.

5. The motor control of claim 4 wherein;
    said differential sensing means is a differential amplifier connected across said one of said orthogonal windings for scaling the voltage induced in said one of said orthogonal windings and for referencing the voltage across said one of said orthogonal windings to zero volts;
    said comparator being connected to said differential amplifier to detect the zero crossing of the output of said amplifier; and
    switching means for selecting the output of said comparator means when comparing a scaled voltage which does not include a current component.

6. The motor control of claim 5 wherein said switching means further comprises:
    logic means responsive to the step commands for controlling selection of the comparator output.

7. The motor control of claim 6 wherein said logic means is a programmed computer.

8. The motor control of claim 3 wherein said drive means has four switching devices connected in an H configuration.

9. The motor control of claim 7 wherein said current responsive means includes a current sensing resistor;
    a comparator connected to compare the voltage drop across said resistor with a reference voltage; and
    a bistable circuit responsive to excess current sensed by said comparator and turn off said four switching devices and responsive to timed input to permit said devices to be again turned on.

10. The method of operating a step motor including the steps of:
    (1) driving a first winding of said motor with a voltage so as to impart motion to the rotor of said motor;
    (2) turning off said voltage to said first winding and causing the current in said first winding to decay to zero;
    (3) directly sensing the voltage induced by the permanent magnet of said rotor in said first winding;
    (4) again driving said first winding of said motor with said voltage in response to said directly sensed voltage.

11. The method of claim 10 further comprising the steps of;
    following step (1), directly sensing the voltage induced by said permanent magnet of said rotor in a second winding orthogonal to said first winding and in response to said voltage induced in said second winding, performing step (2).

12. The motor control of claim 4 wherein said drive means is responsive to said comparator means to cease driving said another of said orthogonal windings and to begin driving said one of said orthogonal windings when the voltage induced in said one of said orthogonal windings by the permanent magnet of the motor crosses zero volts.

* * * * *